May 11, 1926.
L. AEBY ET AL
LIQUID CIRCULATING SYSTEM
Filed Oct. 20, 1922
1,584,002
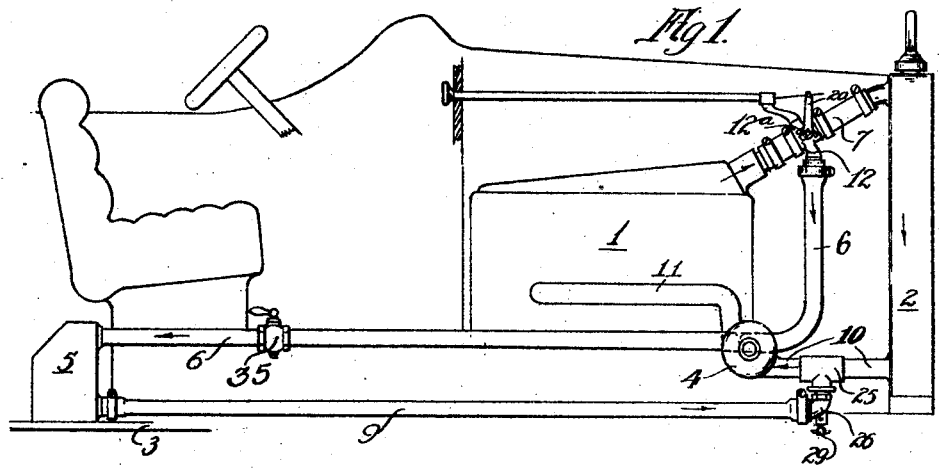
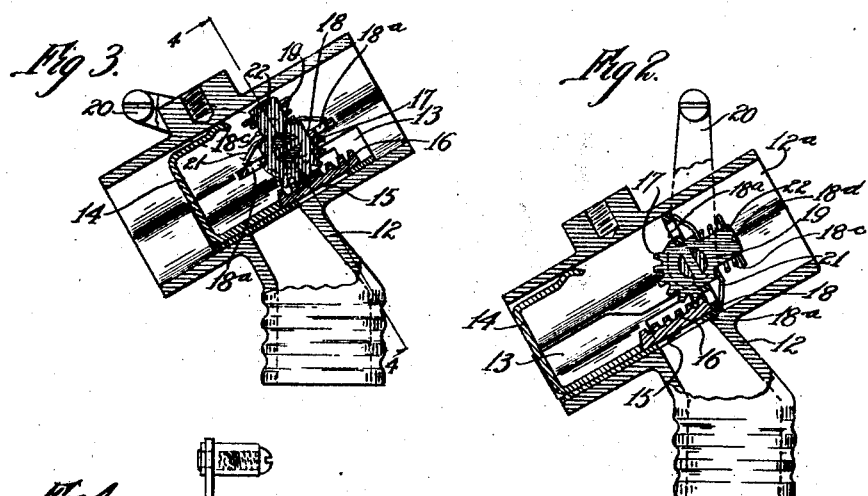
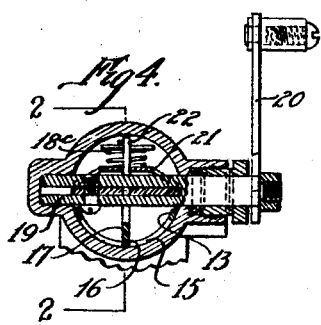
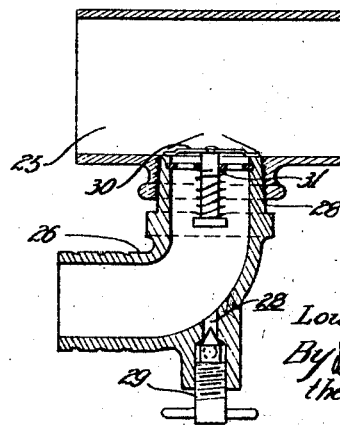
INVENTORS.
Louis Aeby
& Henry Kocourek
By Burton & Burton
their ATTORNEYS.
Witness.
J. O. McKnight.

Patented May 11, 1926.

1,584,002

UNITED STATES PATENT OFFICE.

LOUIS AEBY AND HENRY KOCOUREK, OF CHICAGO, ILLINOIS; SAID KOCOUREK ASSIGNOR TO SAID AEBY.

LIQUID-CIRCULATING SYSTEM.

Application filed October 20, 1922. Serial No. 595,722.

The purpose of this invention is to provide an improved construction for utilizing the cooling liquid of the engine-cooling circulatory system of a motor vehicle for heating the cab of the vehicle. It consists in the elements and features of construction shown and described as indicated in the claims.

In the drawings:—

Figure 1 is a partly sectional view of the nature of a side elevation of a portion of the cab of the motor car and engine equipped with this invention.

Figure 2 is a detail section as at line 2—2 on Figure 4 axial with respect to the passages of the circulatory system and the junction of the two circuits thereof, one of which contains the radiator and the other of which contains the heater, a valve device at said junction being shown in closed position adapted for opening by a predetermined pressure.

Figure 3 is a view similar to Figure 2, showing the valve device in open position.

Figure 4 is a similar section at the junction of the two circuits between the pump and the radiator.

Figure 5 is a section axial with respect to the passages of a valved fitting at the junction of the two circuits between the radiator and the pump intake.

In the drawings the engine is represented in conventional form at 1, the radiator at 2. A portion of the floor of the cab is shown at 3. The water circulating pump for positive circulation of the cooling water of the engine jacket is shown at 4 in conventional relation to the engine and the radiator, and connected to the jacket by the pipe, 11. 5 represents conventionally the heater in the cab, supplied by an inleading pipe, 6, which leads off as a branch from the customary flexible pipe coupling shown at 7 which extends from the engine jacket to the radiator, said heater being connected by an outleading pipe, 9, to the intake pipe, 10, of the pump, 4, said connection being made between the discharge from the radiator and the pump by a T-fitting, 25, and elbow, 26, hereinafter more particularly mentioned. The connection of the heater in-leading pipe, first mentioned, to the pipe, 7, is made by means of a T-fitting, 12, interposed in said pipe, having the cross member, 12ª, of the T, which constitutes the direct feed from the engine into the radiator fitted with a valve device which comprises a sliding valve, 13, which is a semi-cylindrical element, seating in the lower half of the T and having a spring arm, 14, extending up across the T and bearing on the upper side for holding the lower side seated for sliding longitudinally, said valve element, 13, having an aperture, 15, which at one position within the range of the sliding movement of said element registers with the opening of the cross member, 12, into the stem of the T, which is connected by the pipe, 6, to the heater. The slide valve element 13, has a rack, 16, engaged with a gear segment, 17, rigid with a valve member, 18, mounted on a transversely-extended pivot stem, 19, journaled in the cross of the T, and extending out through one side thereof for carrying an operating lever handle, 20. The rack, 16, extends across the aperture, 15, of the semi-cylindrical valve member, 13, but without materially obstructing the aperture, as will be understood from Figure 4; and the rack, 16, and the gear segment teeth are related respectively to the slide valve member, 13, and transverse valve member, 18, and said two valve members are related so that at the open position of the slide valve member,—that is, at the position at which the aperture, 15, registers with the passage to the stem of the pinion, the valve member, 18, is at directly transverse or closing position in the passage at the cross of the T. Said valve member, 18, has apertures, 18ª, for passage of the water through said valve, and is rendered effective as a closing device by means of the supplemental valve member, 21, mounted on a stem, 22, which projects axially from the member, 18, said supplemental valve member having its circumference seating upon the member, 18, outside the ports, 18ª, and being held normally in said seating position by a spring, 18ᶜ, coiled on the stem, 22, and checked by a cross-pin, 18ᵈ, therethrough, thereby operating as a check valve or spring seated valve for closing the ports, 18ª, and making the valve member, 18, effective for closing the passage through the cross member, 12, against flow from the radiator toward the pump and for checking flow in the opposite direction except upon pressure in that direction adequate to overcome the spring, 18ᶜ, and force the check valve member, 21, from seat upon the main valve member, 18.

The return pipe, 9, from the heater, 5, to the pump, 4, is connected to the radiator circuit by a T-fitting, 25, interposed in the pipe connection from the bottom of the radiator to the intake of the pump, the return pipe, 9, being connected to said casing by an elbow, 26, which at its connection with the stem, 28, has a spring-seated valve, 30, opening against its spring 31, into the cross of the T,—that is, toward the intake of the motor. Said elbow is fitted at its bend with a drain passage, 28, closed by a screwed-in valve, 29, for the purpose of clearing the elbow of sediment which may accumulate from the circulatory water.

Upon consideration of the construction as above described, it will be seen that it consists of two circulatory systems, one comprising in its course the radiator of the engine, and the other comprising the cab heater; and that the courses of these two systems interlap over a portion common to both, comprising the water jacket of the engine, the chamber of the pump, 4, and the pipe, 11, which connects the pump to the jacket.

It will be understood that the valve device interposed between the discharge from the engine jacket and the pump when adjusted to the position shown in Figure 2, has its spring-pressed check valve positioned for permitting the liquid circulated by the pump to pass to the radiator only when the pressure is sufficient to open said spring-pressed valve against the resistance of its spring 18°; and that thereby, in any event, a certain portion of the water will pass the slide valve member, 13, which at that position is open into the pipe, 6, and thence to the heater, 5, returning by way of the pipe, 9, and the spring-seated valve, 30, to the intake of the pump.

When it is not required to use the cooling water for the heater, and it is important that it pass to the radiator for being cooled, the handle, 20, serves to rock the valve member, 18, around to the position shown in Figure 3, opening the passage through the cross of the T from the engine jacket to the top of the radiator; and at the same time closing the port leading into the stem of the T and to the pipe, 6, for supplying the heater.

It will be understood that at either adjustment of the valve device between the jacket and the radiator, the valve device 30, between the heater and the radiator operates as a check, opening only toward the pump and only upon substantially the same pressure as is necessary to open the check valve, 21, for passage of the water through the ports.

It may sometimes be desirable to cut off the circulation from the heater while retaining the seated valve, 21, in operative position as shown in Figure 2, opening only upon a predetermined pressure; and for that purpose there is provided in the pipe, 6, a shut-off valve, 35, which may be closed more or less or completely, according to whether it is desirable to shut off or merely check the flow of water to the heater.

We claim:—

1. In a water circulatory system comprising two interlapping circuits having communication for pressure in one direction through the interlapping region; a valve device situated at the point of divergence of said circuits after their interlapping course, comprising a yieldingly seated valve obstructing the entrance to one course, and a positively seated valve adjustable at will for controlling entrance to the other course; operating connections between the two valves for setting the yieldingly seated valve positively at open position when the positively operated valve is at closed position and the yieldingly seated valve at yieldingly seated position when the positively operated valve is at open position.

2. In the construction defined in claim 1, a seat-affording member for the yieldingly seated valve having the latter mounted upon it, said seat-affording member being itself mounted for movement to carry the yieldingly seated valve positively to positively open position.

3. In the construction defined in claim 1, a seat-affording member for the yieldingly seated valve having the latter mounted upon it, said seat-affording member being itself mounted for movement to carry the yieldingly seated valve positively to positively open position, operating connection between the seat-affording member and the positively seated valve for moving said member to positively open position of the yieldingly seated valve in the movement of the positively operated valve to closed position.

4. In a water circulating system comprising two inter-communicating circuits adapted for communication with a common source of pressure, in combination with a spring seated valve device in one of said circuits adapted to yield to a predetermined pressure, and in the case of less pressure to hold back the circulating liquid from said circuit and deflect it mainly into the other circuit, a positively operable valve controlling a connection between the two circuits, said first mentioned spring seated valve being mounted upon the positively operated valve controlling a port through the latter and positioned so as to be carried with said positively operating valve in the opening movement of the latter.

5. In a liquid-circulating system in combination with a passage having a branch, a valve device at the junction of the branch with the main passage, comprising a slide valve in the main passage for closing the communication of the branch with said main passage; a pivoted valve in the main passage for closing the latter at transverse position of said valve therein; means connecting the slide valve and the pivoted valve for closing the former by the opening movement of the latter.

6. In a liquid circulating system, in combination with a passage having a branch, a valve device at the junction of the branch with the main passage, comprising a slide valve in the main passage for closing the communication of the branch with said main passage; a pivoted valve in the main passage for closing the latter at transverse position of said valve therein; a rack on the slide valve and a gear member on the pivoted valve intermeshing for moving the slide valve to closed position by the movement of the pivoted valve to open position, the pivoted valve having ports for passage of liquid through it at its closed position; and a spring-seated check valve mounted on said pivoted valve for yieldingly closing said ports.

In testimony whereof, we have hereunto set our hand at Chicago, Illinois, this 17th day of October, 1922.

LOUIS AEBY.
HENRY KOCOUREK.